US008348613B2

(12) United States Patent
Gregg et al.

(10) Patent No.: US 8,348,613 B2
(45) Date of Patent: Jan. 8, 2013

(54) AIRFLOW INFLUENCING AIRFOIL FEATURE ARRAY

(75) Inventors: Shawn J. Gregg, Wethersfield, CT (US); Tracy A. Propheter-Hinckley, Manchester, CT (US); Amanda Jean Learned, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 545 days.

(21) Appl. No.: 12/413,649

(22) Filed: Mar. 30, 2009

(65) Prior Publication Data

US 2010/0247284 A1 Sep. 30, 2010

(51) Int. Cl.
*B64C 11/00* (2006.01)

(52) U.S. Cl. .......................................... 416/96 A; 415/1

(58) Field of Classification Search ..... 415/1; 416/96 A
See application file for complete search history.

(56) References Cited

U.S. PATENT DOCUMENTS 3,527,543 A * 9/1970 Howald ...................... 416/90 R
3,628,880 A 12/1971 Smuland
3,809,494 A 5/1974 Redman
3,858,290 A 1/1975 Albani
4,025,226 A 5/1977 Hovan
4,063,851 A 12/1977 Weldon
4,065,851 A 1/1978 Kummer et al.
4,153,386 A 5/1979 Leogrande et al.
4,437,810 A 3/1984 Pearce
4,474,532 A 10/1984 Pazder
4,482,295 A 11/1984 North et al.
4,775,296 A 10/1988 Schwarzmann et al.
5,395,212 A * 3/1995 Anzai et al. ................. 416/97 R
5,468,125 A * 11/1995 Okpara et al. .............. 416/97 R
5,586,866 A 12/1996 Wettstein
5,669,759 A 9/1997 Beabout
5,857,837 A 1/1999 Zelesky et al.
6,142,734 A 11/2000 Lee
6,406,260 B1 6/2002 Trindade et al.
6,428,273 B1 8/2002 Keith et al.

(Continued)

FOREIGN PATENT DOCUMENTS

EP 0416542 3/1991
EP 0905353 3/1999
EP 1473439 2/2004

(Continued)

OTHER PUBLICATIONS

European Search Report dated Aug. 21, 2012 for European Application No. 10250362.0.

*Primary Examiner* — Julio J Maldonado
*Assistant Examiner* — Robert Bachner
(74) *Attorney, Agent, or Firm* — Carlson, Gaskey & Olds PC

(57) ABSTRACT

An example gas turbine engine airfoil includes an airfoil wall establishing a cavity that extends axially from an airfoil leading edge portion to an airfoil trailing edge portion and extends radially from an airfoil inner end to an airfoil outer end. The cavity is configured to receive a baffle that is spaced from the airfoil leading edge portion such that an impingement cooling area is established between the airfoil leading edge portion and the baffle when the baffle is received within the cavity. An array of nonuniformly distributed features is disposed on the airfoil wall within the impingement cooling area. The features are configured to influence airflow within the impingement cooling area.

21 Claims, 4 Drawing Sheets

U.S. PATENT DOCUMENTS 6,602,047 B1 * 8/2003 Barreto et al. .................... 415/1
6,607,355 B2 * 8/2003 Cunha et al. ................ 416/97 R
6,612,808 B2 9/2003 Lee et al.
6,846,575 B2 1/2005 Hasz et al.
6,916,155 B2 7/2005 Eneau et al.

FOREIGN PATENT DOCUMENTS

EP 1870561 12/2007
EP 1921268 5/2008
GB 1304678 1/1973

* cited by examiner

AIRFLOW INFLUENCING AIRFOIL FEATURE ARRAY

BACKGROUND

This application relates generally to an array of features configured to influence airflow from an airfoil baffle.

Gas turbine engines are known and typically include multiple sections, such as a fan section, a compression section, a combustor section, a turbine section, and an exhaust nozzle section. The fan section moves air into the engine. The air is compressed in the compression section. The compressed air is mixed with fuel and is combusted in the combustor section. As known, some components of the engine operate in high temperature environments.

The engine includes vane arrangements that facilitate guiding air. The engine also includes blade arrangements mounted for rotation about an axis of the engine. The vane arrangements and the blade arrangements have multiple airfoils extending radially from the axis. As known, the airfoils are exposed to high temperatures and removing thermal energy from the airfoils is often necessary to avoid melting the airfoils.

Accordingly, engines often route bypass air to cavities within the airfoils. The air then removes thermal energy from the airfoils through impingement cooling, film cooling, or both. Some airfoils are configured to receive an impingement baffle. The bypass air moves through holes in the impingement baffle and impinges on interior surfaces of the airfoil. The bypass air then moves through film cooling holes or slots within the airfoil. Some areas of the airfoil must withstand higher temperatures than other areas of the airfoil. Manipulating the size and position of the holes within the baffle can increase thermal energy removal from some areas of the airfoil. However, removing thermal energy from areas near the leading edges and radial centers of the airfoils is especially difficult.

SUMMARY

An example gas turbine engine airfoil includes an airfoil wall establishing a cavity that extends axially from an airfoil leading edge portion to an airfoil trailing edge portion and extends radially from an airfoil inner end to an airfoil outer end. The cavity is configured to receive a baffle that is spaced from the airfoil leading edge portion such that an impingement cooling area is established between the airfoil leading edge portion and the baffle when the baffle is received within the cavity. An array of nonuniformly distributed features is disposed on the airfoil wall within the impingement cooling area. The features are configured to influence airflow within the impingement cooling area.

An example gas turbine engine airfoil assembly includes an airfoil wall extending axially from an airfoil leading edge portion to an airfoil trailing edge portion and extending radially from an airfoil inner diameter to an airfoil outer diameter. The airfoil wall establishes an airfoil interior. A baffle is positioned within the airfoil interior and is spaced from the airfoil leading edge portion to establish a cooling cavity portion of the airfoil interior in front of the baffle. A first rib disposed on the airfoil wall is disposed on the airfoil wall at a first angle. A second rib is disposed on the airfoil wall as a second angle. The first rib and the second rib are disposed at nonzero angles relative to each other and are configured to influence airflow within the impingement cooling area to move in different directions.

An example method of cooling a gas turbine engine airfoil includes communicating airflow through a leading edge portion of a baffle and influencing the airflow using a nonuniform array of features that are disposed on the interior surface of the vane wall. The nonuniform array of features is configured to move some of the airflow toward a radially central portion of the airfoil These and other features of the example disclosure can be best understood from the following specification and drawings. The following is a brief description of the drawings.

DETAILED DESCRIPTION

Figure 1:
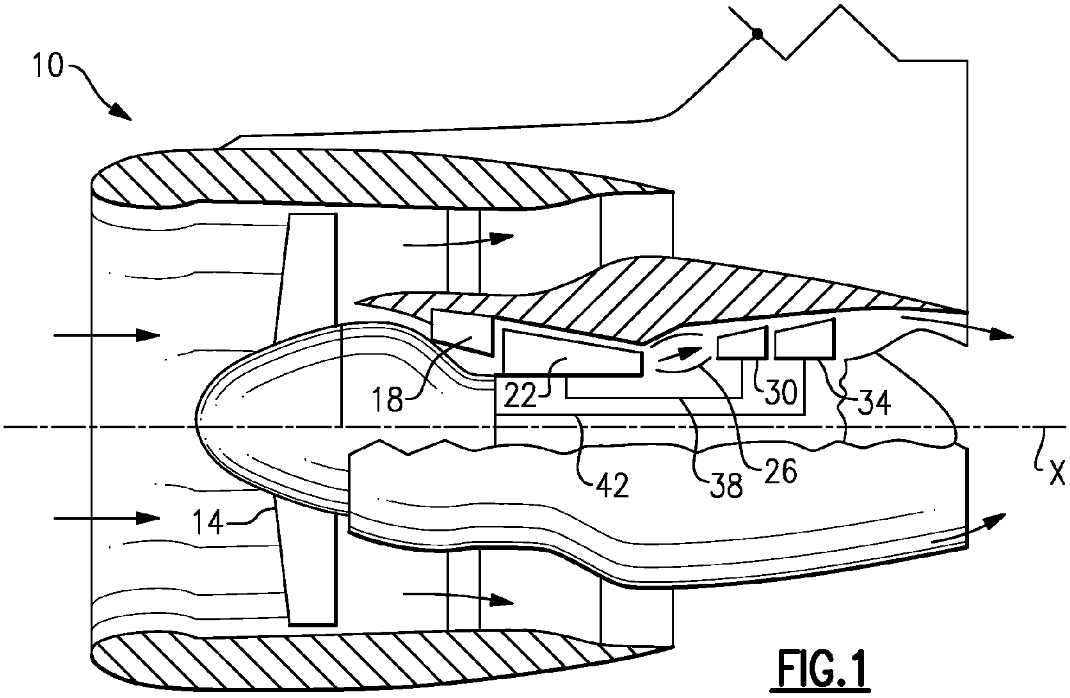
FIG. 1 shows a schematic view of an example gas turbine engine.

FIG. 1 schematically illustrates an example gas turbine engine 10 including (in serial flow communication) a fan section 14, a low-pressure compressor 18, a high-pressure compressor 22, a combustor 26, a high-pressure turbine 30, and a low-pressure turbine 34. The gas turbine engine 10 is circumferentially disposed about an engine centerline X. During operation, air is pulled into the gas turbine engine 10 by the fan section 14, pressurized by the compressors 18 and 22, mixed with fuel, and burned in the combustor 26. The turbines 30 and 34 extract energy from the hot combustion gases flowing from the combustor 26.

In a two-spool design, the high-pressure turbine 30 utilizes the extracted energy from the hot combustion gases to power the high-pressure compressor 22 through a high speed shaft 38. The low-pressure turbine 34 utilizes the extracted energy from the hot combustion gases to power the low-pressure compressor 18 and the fan section 14 through a low speed shaft 42. The examples described in this disclosure are not limited to the two-spool architecture described and may be used in other architectures, such as a single-spool axial design, a three-spool axial design, and still other architectures. That is, there are various types of engines that could benefit from the examples disclosed herein, which are not limited to the design shown.

Figure 2:
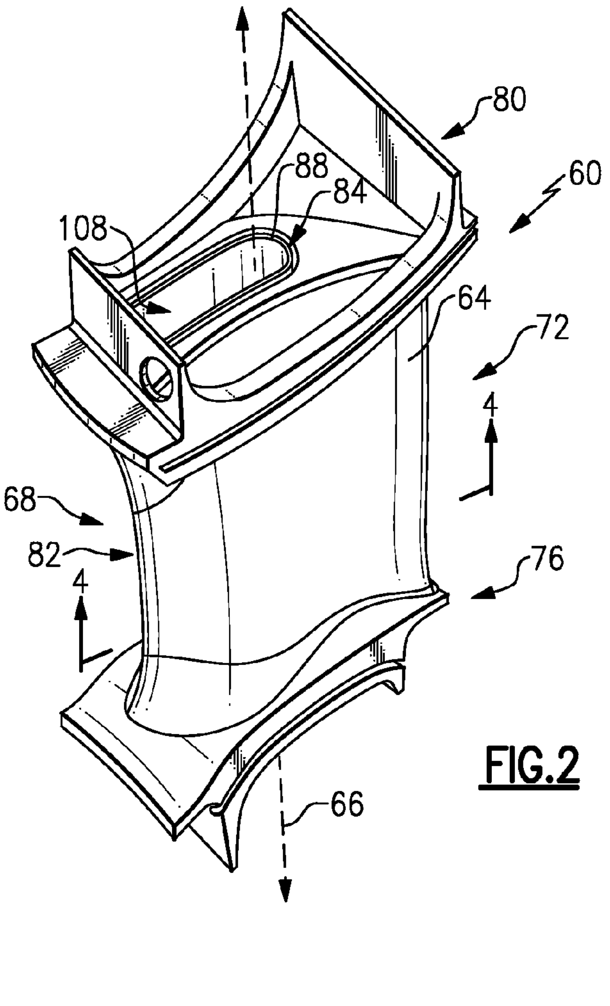
FIG. 2 shows a perspective view of an example airfoil of the FIG. 1 engine.
Figure 3:
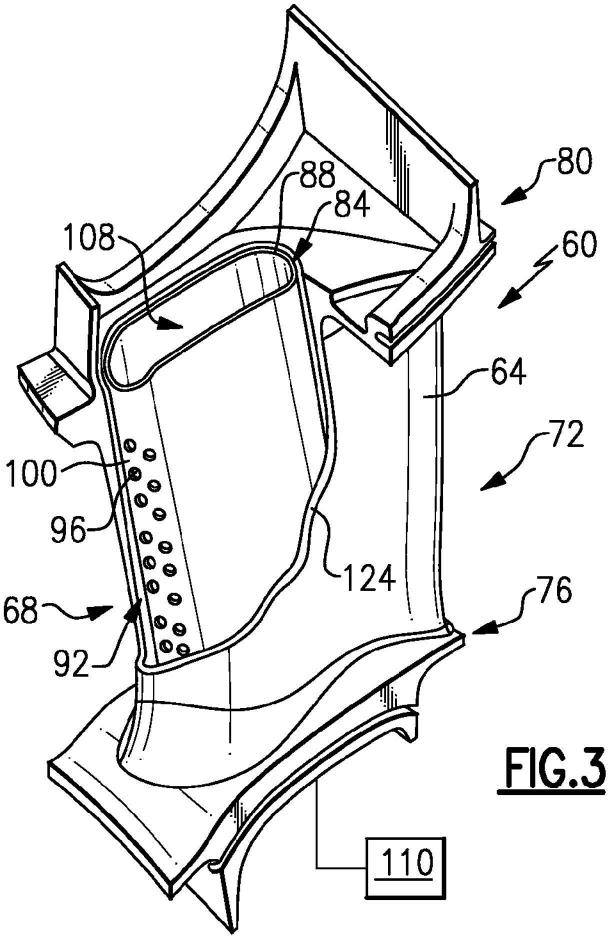
FIG. 3 shows a partially cut away view of the FIG. 2 airfoil.
Figure 4:
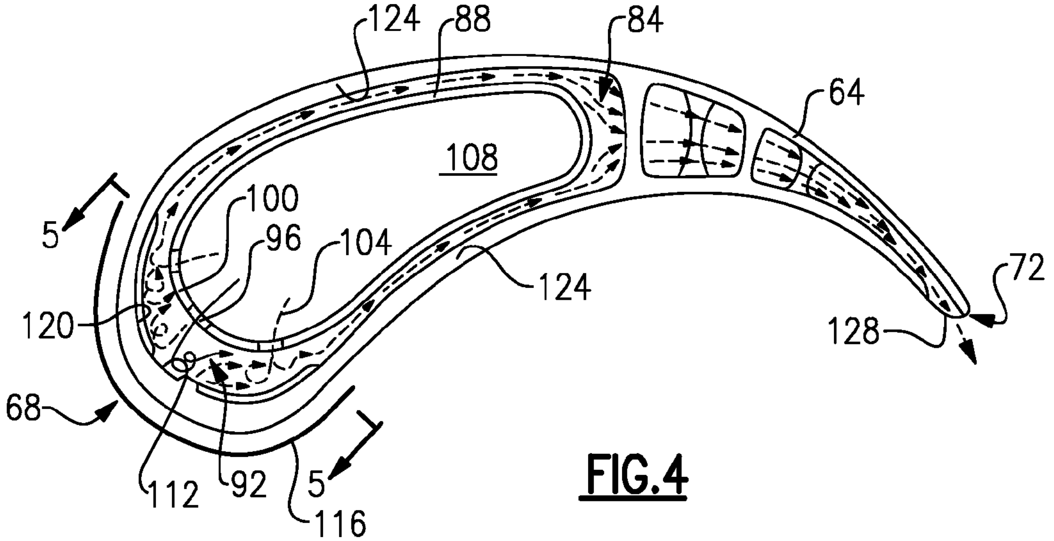
FIG. 4 shows a cross-sectional view at line 4-4 of FIG. 2.

Referring to FIGS. 2-4 with continuing reference to FIG. 1, an example airfoil 60 includes an airfoil wall 64 that extends axially between a leading edge portion 68 and a trailing edge portion 72. The example airfoil 60 is a vane of the engine 10. In another example, the airfoil 60 is a blade of the engine 10.

The airfoil wall 64 extends radially along a longitudinal axis 66 between an airfoil inner end 76 and an airfoil outer end 80. A central portion 82 of the leading edge portion 68 is radially equidistant the airfoil inner end 76 and the airfoil outer end 80. As known, areas of the airfoil 60 near the central portion 82 often experience higher temperatures than other areas of the airfoil 60 during operation of the engine 10.

The example airfoil wall 64 establishes a cavity 84 that receives a baffle 88. In this example, the baffle 88 is a sheet metal sock that is spaced from the leading edge portion 68 of the airfoil wall 64 to establish an impingement cooling area 92 between the baffle 88 and the leading edge portion 68 of the airfoil 60. A plurality of holes 96 established within a leading edge portion 100 of the baffle 88 are configured to communicate flow of fluid 104 from an interior 108 of the baffle 88 to the impingement cooling area 92. The cavity 84 includes the interior 108 and the impingement cooling area 92 in this example. As known, the fluid 104 is typically bypass air that is communicated to the interior 108 from an air supply 110 in another area of the engine 10.

Fluid 104 moving from the interior 108 through the plurality of holes 96 in the leading edge portion 100 of the baffle 88 moves across the impingement cooling area 92 and contacts an interior surface 112 of the airfoil wall 64 at the leading edge portion 68 of the airfoil 60. In this example, the leading edge portion 68 of the airfoil wall 64 corresponds to the area of the airfoil wall 64 adjacent a line 116. Fluid 104 then moves aftward from the impingement cooling area 92 around the baffle 88 toward the trailing edge portion 72. In this example, the baffle 88 is spaced from side walls 124 of the airfoil wall 64, which allows flow of fluid 104 from the impingement cooling area 92 around the baffle 88. Fluid 104 moves through a plurality of slots 128 at the trailing edge portion 72 of the airfoil 60.

In this example, a plurality of features 120 are disposed on the interior surface 112 of the leading edge portion 68. The features 120 influence flow of fluid 104 in the impingement cooling area 92 before the fluid 104 moves around the baffle 88. The features 120 facilitate cooling the leading edge portion 68. For example, the features 120 in this example redirect flow of fluid 104 and increase the turbulence of the fluid 104. The features 120 also expose more surface area of the interior surface 112 to the fluid 104 to facilitate cooling the leading edge portion 68.

In some examples, the leading edge portion 68 of the airfoil 60 establishes a plurality of holes (not shown) configured to communicate some of the fluid 104 from the impingement cooling area 92 through the airfoil wall 64 near the leading edge portion 68. These examples, may establish holes, such as showerhead arrangements of holes, near the leading edge portion 68 or elsewhere within the airfoil 60.

Figure 5:
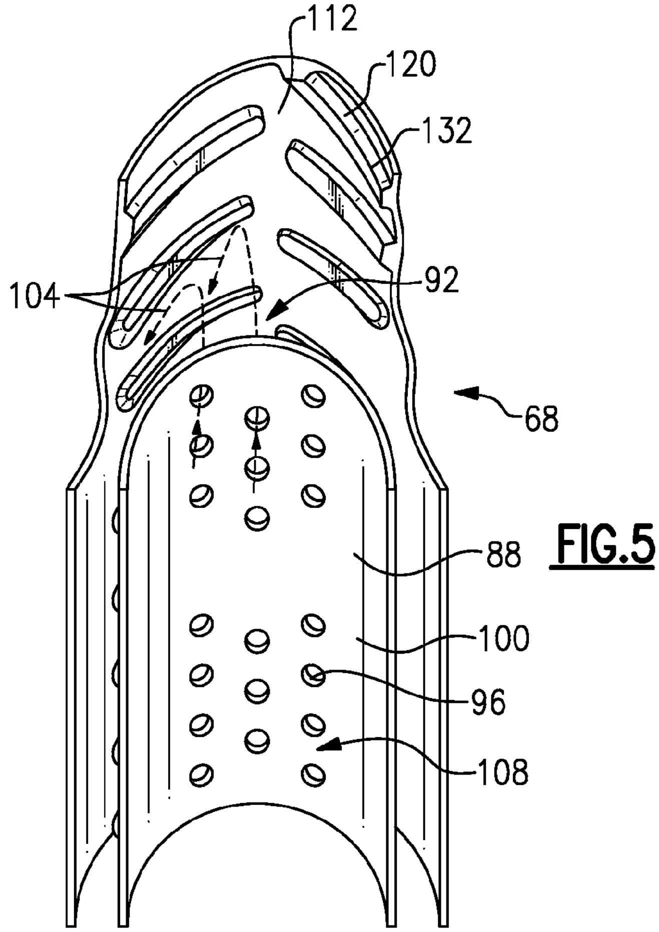
FIG. 5 shows a cross-sectional view at line 5-5 of FIG. 4.
Figure 5A:
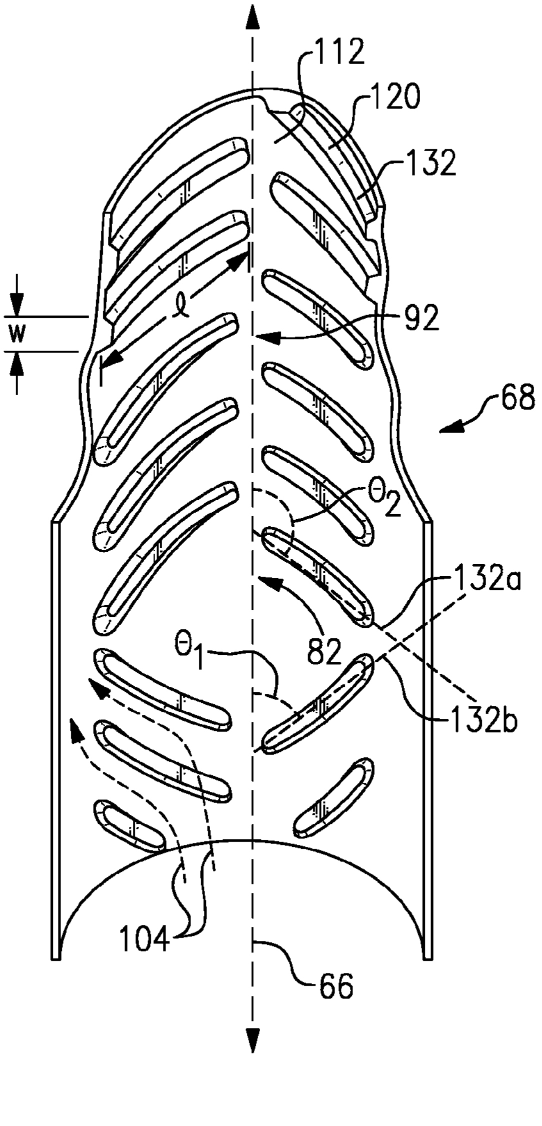
FIG. 5A shows the FIG. 5 cross-sectional view with the baffle removed.

Referring now to FIGS. 5 and 5A with continuing reference to FIG. 2, in this example, the features 120 include a plurality of fins or ribs 132 disposed at angles $\theta_1$ and $\theta_2$ relative to the longitudinal axis 66. Generally, the ribs 132 that are radially outboard the central portion 82 are angled to direct the fluid 104 radially inboard toward the central portion 82, and the ribs 132 radially inboard the central portion 82 are angled to direct the fluid 104 radially outboard toward the central portion 82. Accordingly, regardless the radial position of the fluid 104 flowing from the baffle 88, the fluid 104 is directed toward the central portion 82 by the features 120, which facilitates cooling the central portion 82. In another example, the fluid 104 is directed toward another radial area of the leading edge portion 68. For example, the features 120 can be configured to direct airflow to move toward a position that is radially inside the center portion 82 and is between 10% and 40% the radial length of the airfoil 60. In another example, the features 120 are configured to direct airflow to move toward a position that is radially outside the center portion 82 and is between 60% and 80% the radial length of the airfoil 60. Directing airflow is one way to influence airflow.

Arranging the example features 120 in a nonuniform array facilitates influencing the flow. In this example, the array is nonuniform because the angles of some of the features 120 vary relative to the longitudinal axis 66 and the spacing between adjacent ones of the features 120 varies. In another example, the array is nonuniform because the spacing between adjacent ones of the features 120 varies or the sizing of adjacent ones of the features 120 varies. In such examples, the ribs 132 may be perpendicular or parallel to the longitudinal axis 66. Directing more flow toward the central portion facilitates removing thermal energy from areas of the airfoil 60 near the central portion 82.

In this example, the ribs 132 extend about 0.0254 cm from the interior surface 112 into the impingement cooling area 92. The example ribs 132 have a width w of about 0.0254 cm and a length 1 of about 0.6350 cm. Other example ribs 132 include different widths, lengths, and extend different amounts from the interior surface 112.

The angle $\theta_1$ between one rib 132*a* and the longitudinal axis 66 is approximately 45°, and the angle θ2 between another rib 132*b* and the longitudinal axis 66 is 135° in this example. Other examples of the ribs 132 may include different combinations of angles depending on the desired influence on the fluid 104 within the impingement cooling area 92.

The example airfoil wall 64 is a cast monolithic structure, and the ribs 132 are formed together with the airfoil wall 64 when the airfoil wall 64 is cast. In another example, the ribs 132 are added to the airfoil wall 64 after the airfoil wall 64 is cast.

Figure 6:
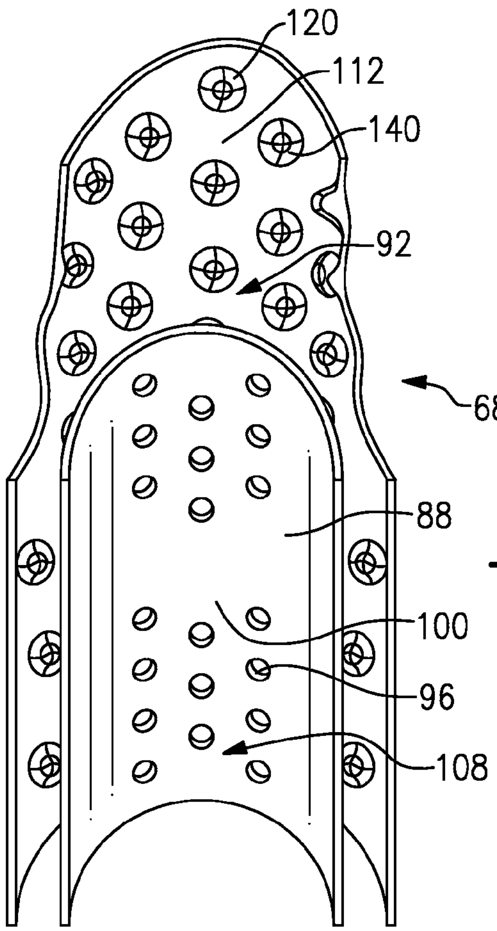
FIG. 6 shows a cross-sectional view at line 5-5 of FIG. 4.
Figure 6A:
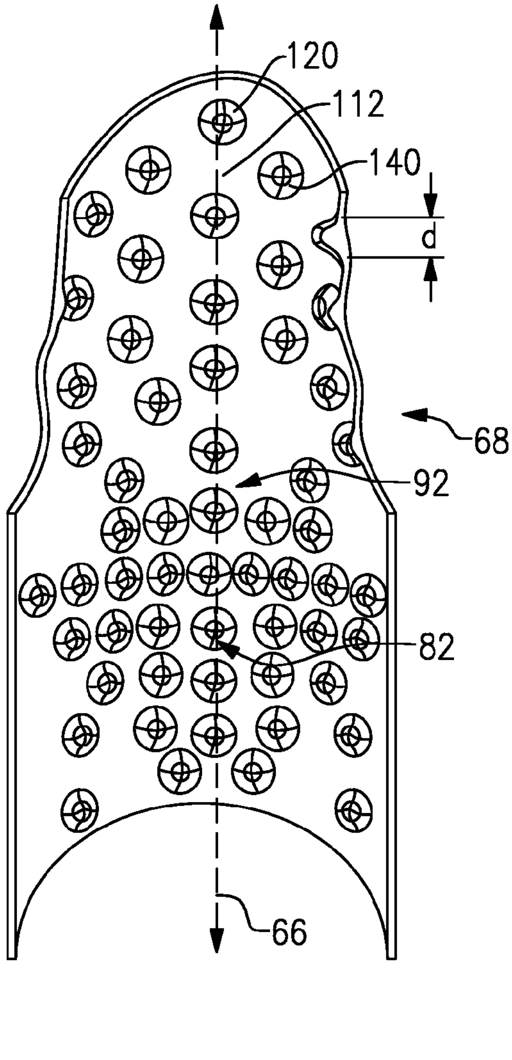
FIG. 6A shows the FIG. 6 cross-sectional view with the baffle removed.

Referring now to FIGS. 6 and 6A with continuing reference to FIG. 2, the features 120 of another example array for influencing flow include a plurality of material deposits 140 having a generally circular profile. The material deposits 140 are configured to turbulate the fluid 104 within the impingement cooling area 92 to facilitate cooling. Turbulating the airflow increases the dwell time of fluid 104 near the leading edge portion 68, which facilitates removing thermal energy. Other examples of the features 120 include trip strips, bumps, grooves, etc.

In this example, the material deposits 140 are clustered more densely near the central portion 82. Accordingly, the fluid 104 near the central portion 82 is more turbulated than the fluid 104 away from the central portion 82. Increasing the turbulence of flow facilitates removing thermal energy from the central portion 82. Thus, in this example, the nonuniform array of features influences flow by increasing the turbulence of flow near the central portion 82 more than flow away from the central portion 82.

In this example, the material deposits 140 have a diameter d of about 0.0254 cm and extend about the 0.0254 cm from the interior surface 112 into the impingement cooling area 92. The example material deposits 140 are weld droplets deposited on the airfoil wall 64 after the airfoil wall 64 is cast. In another example, the material deposits 140 are raised areas of the airfoil wall 64 that are cast with the airfoil wall 64.

Although the features 120 are described as ribs 132 and material deposits 140, a person skilled in the art and having the benefit of this disclosure would understand other features and combination of the features 120 suitable for influencing flow within the impingement cooling area 92.

Features of the disclosed embodiments include facilitating cooling of an airfoil by influencing flow from a baffle within the airfoil.

Although a preferred embodiment has been disclosed, a worker of ordinary skill in this art would recognize that certain modifications would come within the scope of this invention. For that reason, the following claims should be studied to determine the true scope and content of this invention.

We claim:

1. A gas turbine engine airfoil comprising:

an airfoil wall establishing a cavity that extends axially from an airfoil leading edge portion to an airfoil trailing edge portion and extends radially from an airfoil inner end to an airfoil outer end, the cavity configured to receive a baffle spaced from the airfoil leading edge portion such that an impingement cooling area is established between the airfoil leading edge portion and the baffle when the baffle is received within the cavity; and an array of nonuniformly distributed features disposed on the airfoil wall within the impingement cooling area, the features configured to influence airflow within the impingement cooling area, wherein the array of nonuniformly distributed features extend away from a planar surface of the airfoil wall.

2. The airfoil of claim 1 wherein the features are configured to influence more airflow to move toward a radial central portion of the airfoil than away from the radial central portion.

3. The airfoil of claim 1 wherein the features are configured to direct airflow toward a position that is radially inside a radial central portion and is between 10% and 20% of the radial length of the airfoil.

4. The airfoil of claim 1 wherein the features are configured to direct airflow toward a position that radially outside a radial central portion and is between 60% and 80% of the radial length of the airfoil.

5. The airfoil of claim 1 wherein the features are configured to influence airflow by increasing the turbulence of airflow near a radial central portion of the airfoil more than the turbulence of airflow near a radial outer portion of the airfoil.

6. The airfoil of claim 1 wherein the array of nonuniformly distributed features comprises a first rib and a second rib, the first rib disposed on the airfoil wall at a first angle relative to a radial axis of the airfoil and the second rib disposed on the airfoil wall at a second angle relative to the radial axis of the airfoil, the first angle different than the second angle, wherein a planar surface of the airfoil extends between the first rib and the second rib.

7. The airfoil of claim 6 wherein the first rib is transverse to the second rib and both the first rib and the second rib are transverse to a radial axis of the airfoil, and the second angle is about 90° greater than the first angle.

8. The airfoil of claim 1 wherein the array of nonuniformly distributed features comprises material deposits having a circular cross-section, each of the features spaced a distance from the closest adjacent feature.

9. The airfoil of claim 8 wherein the distances are smallest near a radially central portion of the airfoil.

10. The airfoil of claim 1 wherein the airfoil wall and the array of nonuniformly distributed features are cast together.

11. The airfoil of claim 1 wherein the airfoil is a vane.

12. A gas turbine engine airfoil assembly comprising:

an airfoil wall extending axially from an airfoil leading edge portion to an airfoil trailing edge portion and extending radially from an airfoil inner diameter to an airfoil outer diameter, the airfoil wall establishing an airfoil interior;

a baffle positioned within the airfoil interior and spaced from the airfoil leading edge portion to establish a impingement cooling area forward of the baffle;

a first rib disposed on the airfoil wall at a first angle; and a second rib disposed on the airfoil wall at a second angle, wherein the first rib and the second rib are disposed at a nonzero angles relative to each other and are configured to influence airflow within the impingement cooling area to move in different directions, wherein the second rib is the closest adjacent rib to the first rib and a planar surface of the airfoil extends between the first rib and the second rib.

13. The airfoil of claim 12 wherein the first rib is located above a radial center of the airfoil, the second rib is located below the radial center of the airfoil, and the first rib and the second rib are configured to influence more air to move toward the radial center of the airfoil than other areas of the airfoil.

14. A method of cooling a gas turbine engine airfoil comprising:

communicating airflow through a leading edge portion of baffle;

influencing the airflow using a nonuniform array of features that are disposed on an interior surface of a vane wall, wherein the nonuniform array of features is configured to move some of the airflow toward a radially central portion of the airfoil, wherein a planar surface of the airfoil extends between adjacent features of the nonuniform array of features.

15. The airfoil of claim 14 wherein nonuniform array of features comprises a plurality of ribs extending longitudinally in a first direction and a plurality of ribs extending longitudinally in a second direction that is transverse to the first direction.

16. The airfoil of claim 1, wherein each of the features in the plurality of features are about the same size.

17. The airfoil of claim 6 wherein the first angle and the second angle are nonzero angles.

18. The airfoil of claim 12 wherein the first rib and the second rib extend the same distance from the airfoil wall toward the baffle.

19. The airfoil of claim 1, wherein a planar surface of the airfoil extends between adjacent features within the array of nonuniformly distributed features.

20. The airfoil of claim 1, wherein each of the features spaced a distance from the closest adjacent feature.

21. The airfoil of claim 14, wherein the features of the nonuniform array of features are spaced a distance from each other.

* * * * *